Figure 1:
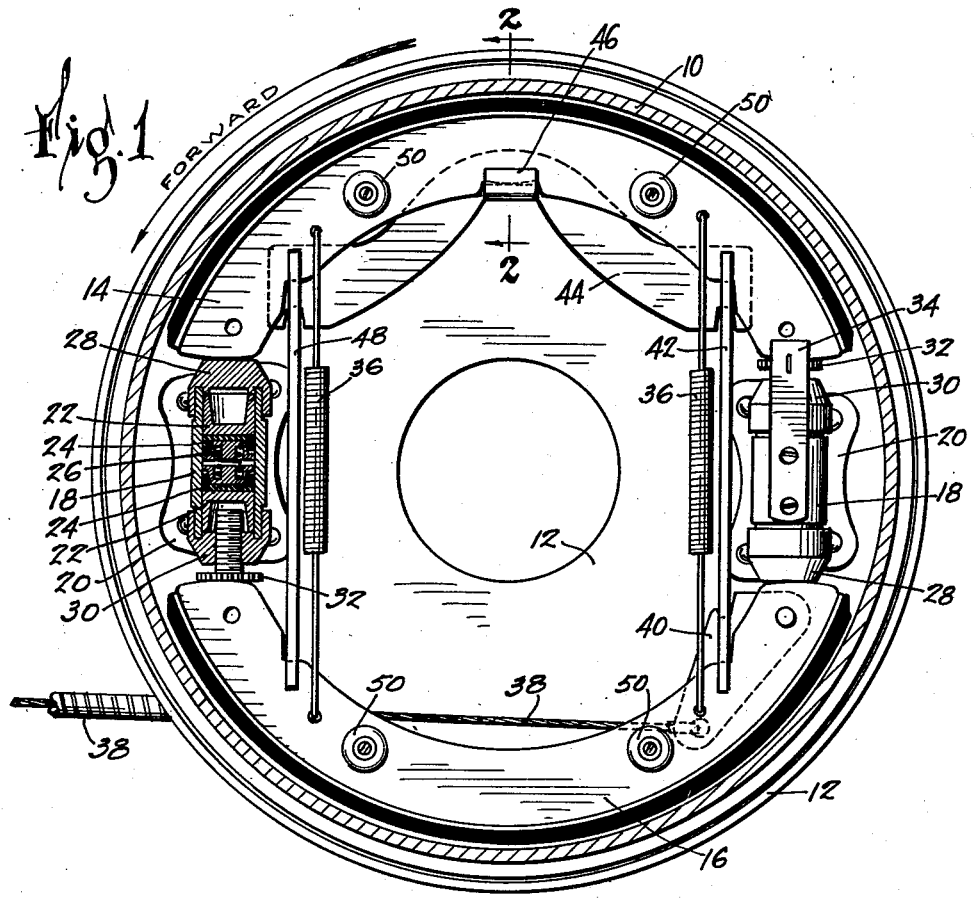

Oct. 14, 1941.    W. J. HUMPHREY    2,258,893
BRAKE
Filed Nov. 15, 1939

INVENTOR.
William J. Humphrey
BY
ATTORNEY.

Patented Oct. 14, 1941

2,258,893

UNITED STATES PATENT OFFICE 2,258,893

BRAKE

William J. Humphrey, South Bend, Ind., assignor to Bendix Aviation Corporation, South Bend, Ind., a corporation of Delaware Application November 15, 1939, Serial No. 304,451

4 Claims. (Cl. 188—106)

This invention relates to brakes, and is illustrated as embodied in an internal expanding brake for an automobile wheel. The brake shown in the drawing is of the type in which the shoes can shift individually to anchor at either end, according to the direction of drum rotation.

An object of the invention is to provide applying means having balanced thrusts on the two shoes, regardless of the shifting of the shoes in forward and reverse braking. Preferably this is in the form of a mechanical linkage, suitable for actuation mechanically by the usual emergency brake lever, in combination with fluid actuating means controlled by the service brake pedal.

Another object is to provide a mechanical linkage of this type which acts on the ends of upper and lower horizontal shoes, leaving the center of the brake unobstructed.

Figure 2:
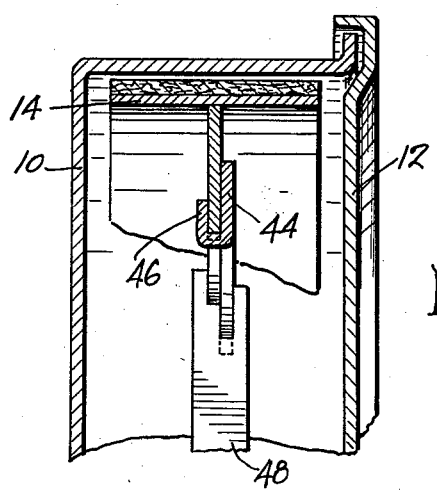

The above and other objects and features of the invention will be apparent from the following description of the brake shown in the accompanying drawing, in which:

Figure 1 is a section vertically through the brake in a plane just inside the head of the brake drum, and showing the shoes in side elevation; and Figure 2 is a partial section on the line 2—2 of Figure 1.

The illustrated brake includes a rotatable drum 10, at the open side of which is a support such as a backing plate 12, and within which are arranged horizontal upper and lower brake shoes 14 and 16. At the front and rear of the brake are fluid actuators, shown as hydraulic wheel cylinders 18, preferably integral with brackets 20 fastened to the backing plate, the cylinders and brackets being heavy enough to serve as brake anchorages.

Each cylinder contains pistons 22, faced with rubber packing cups 24 held against them by a spring 26. One of each pair of pistons acts on a plain cap 28 loosely fitting over one end of the cylinder and directly engaging one of the shoes, and the other acts on a cap 30 fitting over the other end of the cylinder and provided with an adjusting screw 32 engaging the end of the other shoe. Each cylinder has a spring pawl 34 engaging and yieldingly holding the serrated head of its adjusting screw 32. Return springs 36 are tensioned between the shoes.

The emergency applying linkage is shown as connected to the brake through a Bowden-type control 38, the cable of which passes through the backing plate 12 and is connected to the end of an operating bellcrank lever 40, the other end of which is pivoted to the end of shoe 16.

Lever 40 is notched to engage a notch in the lower end of a vertical thrust member 42, the upper end of which similarly engages the end of a horizontal balance lever 44 arranged beside the web of shoe 14, and the center of which is fulcrumed on the web of shoe 14 by means of a lug 46 bent around the web as shown in Figure 2. The other end of lever 44 engages the upper end of a vertical thrust member 48, the lower end of which directly engages the web of shoe 16 adjacent the end of the shoe.

The shoes may have suitable steady rests 50 if desired.

It will be seen that the central portion of the brake, between the vertical springs 36 and the vertical thrust members or struts 42 and 48, is entirely unobstructed. This adapts the brake for use on certain axles which have flanges or other parts taking up a good deal of room at the center of the brake.

In operation, the service pedal operates the usual hydraulic system connected to the cylinders 20 at the front and rear of the brake. The shoes are thereby spread apart against the resistance of springs 36, the shoes anchoring through caps 30 or 28 according to the direction the drum is turning. If the emergency brake lever is operated, it applies mechanically balanced brake-applying thrusts to the shoes through the linkage 40—42—44—48.

While one illustrative embodiment has been described in detail, it is not my intention to limit the scope of the invention to that particular embodiment, or otherwise than by the terms of the appended claims.

I claim:

1. A brake comprising a drum, a pair of shoes which are individually shiftable, means for anchoring each of the said shoes at either end in accordance with the direction of drum rotation, a balanced applying lever having between its ends means for thrusting against a generally central part of one shoe to apply it to the drum, thrust members extending from the ends of the lever to opposite ends of the other shoe and one of which engages one end of the other shoe, an operating lever pivoted to the other end of said other shoe and to the second one of said thrust members, and applying means acting on said operating lever.

2. A brake comprising a drum, a pair of shoes which are individually shiftable, means for anchoring each of the said shoes at either end in accordance with the direction of drum rotation, fluid actuators between the ends of the shoes at opposite sides of the brake, a balanced applying lever having between its ends means for thrusting against a generally central part of one shoe to apply it to the drum, thrust members extending from the ends of the lever to opposite ends of the other shoe and one of which engages one end of the other shoe, an operating lever pivoted to the other end of said other shoe and to the second one of said thrust members, and applying means acting on said operating lever.

3. A brake comprising a drum and a pair of shoes engageable therewith, fluid actuators between the ends of the shoes at opposite sides of the brake, a balanced applying lever having between its ends means for thrusting against one shoe to apply it to the drum, thrust members extending from the ends of the lever to the other shoe and one of which directly engages said other shoe, an operating lever pivoted to said other shoe and to the second one of said thrust members, and applying means acting on said operating lever.

4. A brake comprising a drum, a plurality of shoes, means for anchoring each of the said shoes at different points depending upon the direction of drum rotation, a balanced applying lever having between its ends means for thrusting against one shoe to apply it to the drum, thrust members extending from points adjacent the ends of the lever toward opposite ends of the other shoe and one of which engages the other shoe adjacent one end thereof, an operating lever pivoted adjacent the other end of said other shoe and to the second one of said thrust members, and applying means acting on said operating lever.

WILLIAM J. HUMPHREY.